United States Patent [19]

Pugh

[11] 3,920,583

[45] Nov. 18, 1975

[54] SUPPORTS FOR CATALYST MATERIALS

[75] Inventor: Stanley Frederick Pugh, Abingdon, England

[73] Assignee: United Kingdom Atomic Energy Authority, London, England

[22] Filed: May 13, 1974

[21] Appl. No.: 469,554

[30] Foreign Application Priority Data

May 11, 1973 United Kingdom............... 22707/73

[52] U.S. Cl. ....... 252/465; 252/466 PT; 252/466 B; 423/213.2; 423/213.5
[51] Int. Cl.² ..................... B01J 21/04; B01J 23/64
[58] Field of Search .......... 252/465, 466 B, 466 PT; 423/213.2, 213.5

[56] References Cited

UNITED STATES PATENTS

| 3,437,605 | 4/1969 | Keith............................... 252/477 R |
| 3,565,574 | 2/1971 | Kearby et al. ................. 252/474 X |
| 3,773,894 | 11/1973 | Bernstein et al................. 423/213.5 |

*Primary Examiner*—W. J. Shine
*Attorney, Agent, or Firm*—Larson, Taylor and Hinds

[57] ABSTRACT

A self supporting substrate support for a catalyst system is provided by a metal, preferably an aluminium bearing ferritic alloy. The metal carries an electrically insulating surface layer, such as alumina, compatible with catalytic material deposited thereon. The system is particularly suitable for catalyst systems for treating exhaust gases of internal combustion engines.

6 Claims, No Drawings

SUPPORTS FOR CATALYST MATERIALS

The invention relates to catalysts and more particularly to substrate supports for catalytic material. The choice of substrate is important in optimising the performance of a catalyst system. A particular problem, for example, is the need for the catalyst system to withstand a severe environment and repeated thermal cycling, such as is met by a car exhaust treatment system.

According to the present invention there is provided a catalyst system comprising a catalytic material deposited upon a substrate of metal carrying a surface layer, such as alumina, compatible with the catalytic material.

Whilst an alumina surface layer is strongly preferred, other electrically insulating surface layers may be employed, such as silica of zirconia.

Preferably the substrate comprises an aluminium bearing ferritic steel which has been heat treated in air to form an essentially alumina surface layer and treated to provide an extended surface area. It will be appreciated that the alumina surface layer upon an aluminium bearing ferritic steel will have traces including with it of iron and any other elements alloyed with the steel. Such a composition is intended to be encompassed by the expressions "an essentially aluminia surface layer."

Preferably the substrate comprises an alloy of iron, chromium, aluminium and yttrium with proportions by weight lying in the range up to 15% chromium, 0.5 to 12% aluminium and 0.1 to 3% yttrium, and the balance of iron.

Catalytic material may be deposited upon the substrate by a conventional technique, such as vapour deposition, or deposition from solution with subsequent heat treatment. To achieve sufficient catalytic activity, it is necessary to extend the exposed surface area of the alloy. This may be achieved, for example, by wash coating with a high surface area porous ceramic powder or by the combined effects of fine division (e.g., to a wire bundle) of the alloy and wash coating with a ceramic powder.

Aluminium bearing ferritic steels have the property of forming an alumina layer on heating in air and the alumina layer protects the steels against further oxidation attack. Such steels have the threefold advantage in their use according to the present invention in their inherent resistance to corrosion, their provision of an alumina surface which is particularly suitable as a substrate support for catalytic material, and in that any cracks formed in the alumina as a consequence of thermal cycling are self-healing on heating in air.

The above specified iron, chromium, aluminium, yttrium alloy, has further advantages. Thus, the alumina film is more stable and more adherent than films of alumina on more conventional aluminium bearing ferritic steels. The alloy is extremely ductile at elevated temperatures so that its resistance to shock and fracture under severe thermal cycling makes the material mechanically acceptable for use in treatment of effluent, such as car exhaust fumes or, more accurately, the exhaust gases of a petrol fuelled internal combustion engine. The alloy is also suitable for use in carbon dioxide and steam.

The wash coating technique for forming a surface layer of carrier material of high exposed surface area comprises dispersing a ceramic powder in liquid, dipping the metal substrate in the dispersion and subsequently drying and heat treating the substrate so that the powder adheres to the metal surface.

For satisfactory operation we have found that it is important that the heat treatment carried out to bake the ceramic powder onto the metal substrate should be carried out at a temperature at least as high as that to which the catalyst system will be subjected in use.

We have further found that particularly good continuity of coating and good adhesion of the ceramic powder are promoted if this is mixed with ceramic in the form of a gel. Thus, for example, the substrate may be dipped into a mixture of an aquasol of ceramic particles together with larger diameter ceramic particles dispersed in the aquasol. When an aquasol is used, its concentration is important. Thus, when using an aquasol of alumina, we have obtained our best results at an aquasol concentration of 5g $Al_2O_3$/100 ml water. If the concentration is low, for example, 0.5g $Al_2O_3$/100ml water, it may not be possible to obtain a continuous surface layer and the subsequent catalyst system may suffer degradation on thermal cycling. If the concentration is high, for example, 20g to 50g $Al_2O_3$/100ml water, the surface layer may crack because of its thickness.

Where it is required that a catalyst should operate at low gas temperatures such as for example catalysts for treating exhaust gases in an effluent or car exhaust system during start-up there is a need to control the heat flow from the catalyst surface such that the exothermic reaction maintains the active surface at the optimum operation temperature. One method to achieve an elevated temperature at the catalyst surface is to provide a surface with projecting particles which may be a ceramic powder sintered onto a flat ceramic substrate and coating the whole surface with the required catalyst. A variation of this process is to coat the ceramic particles with catalyst before applying as a wash or in any other way which spreads the particles in a uniform manner over the substrate. The particles may then be attached to the surface in a number of ways which would include sintering or using a material which wets the substrate surface at elevated temperatures and hence reduces the temperature required for obtaining a strong bond. It may be desirable to choose the particle size of the ceramic powder to suit the particular reaction which is under consideration such that the temperature of the active surface does not rise so high that the catalyst loses its activity. For general purposes a range of particle sizes would be most suitable particularly for processes where the temperature of the reaction is low during start-off but then rises to a much higher level. For very low temperatures of operation instead of solid powder particles it may be desirable to use a dendritic powder such as those prepared from the vapour phase e.g., smokes, to increase the isolation from the substrate. One of the critical factors in making such a catalyst is in bonding the smoke or powder to the substrate so that it does not become detached during the operation. One method to achieve this is to coat the substrate with a low melting point material which during heat treatment melts and reacts with the substrate and those parts of the powder in contact with it to form the high melting point phase. The coating may be in the form of a very thin layer of metal which oxidises during heat treatment to form a refractory oxide. It is not essential that the small particles are coated before bonding to the base material. It may be preferable in some cases to bond the particles to the surface before coating with catalyst. It is however again necessary to attach the particles at a relatively low temperature so that the geometry of the fine particles or smokes is not destroyed by the heat treatment. In this case, however, it will be appreciated that subsequent use of the catalyst system manufactured in this way will be limited to correspondingly low temperatures.

A preferred catalytic material, particularly for a catalyst system for treatment of car exhaust gases, is platinum. However, other catalytic materials such as palladium, iridium or rhodium may be employed according to the intended use of the system.

A specific example of catalyst system embodying the invention, and a method of manufacture will now be described.

In this example the catalyst system is in the structural form illustrated by FIG. 2 of British Patent Specification No. 15579/73, in which two self supporting metal matrices of cylindrical form and carrying the catalytic material are mounted in spaced cylindrical chambers connected in series to the exhaust manifold of an engine.

Exhaust gas leaving the engine manifold enters the first chamber and contacts the first catalyst under reducing conditions in which oxides of nitrogen are catalytically reduced to nitrogen and oxygen.

To oxidise carbon monoxide, it is necessary to introduce oxygen and this is achieved, in this example, by a pumped supply of air into a pipeline connected to inject the air in series with the exhaust gases with the second chamber. The exhaust gases thus contact the second catalyst under oxidising conditions in which carbon monoxide is catalytically oxidised to carbon dioxide.

The manufacture of the catalyst system is as follows:

An unoxidised aluminium bearing ferritic alloy, specifically that available under the Trade Mark "Fecralloy," is worked into a self supporting cylindrical matrix. The matrix may be in the form of a wire bundle or may be formed from 0.0125 cm thick sheet corrugated and wound up, with an interleaved plane sheet, into a spiral.

The prepared unoxidised alloy is dipped into a dispersion of alumina in water. The dispersion comprises a mixture of dispersed alumina gel particles with alumina particles of larger diameter, the ratio being typically about 8 parts by weight of large diameter particles to 1 part by weight of gel particles. The gel particles have a diameter of about 100 Angstrom units, whereas the larger diameter particles are chosen according to the requirements of the finished coating.

Thus, to provide maximum extension of the surface area, the larger diameter particles are desirably of $\gamma$ alumina having a surface area of the order of 200 m$^2$/gm. However, if lower surface area is acceptable, the larger diameter particles may comprise $\alpha$ alumina powder of average particle size in the range 1 to 5 microns or $\delta$ alumina spherical particles of diameter in the range 1 to 15 microns, although it should be noted that dispersion becomes more difficult with powders of particle size greater than about 10 microns.

To improve the uniformity of the coating and the adhesion during and after initial drying, the dispersion also includes a wetting agent and a binder. In this example 45 ml of dispersion contained as wetting agent 20 drops of a 1% solution of BDH Nonidet P40 which is an octylphenol ethylene oxide condensate and, as binder, 7 ml of a 2.5% solution of Movial N85–88 which is a polyvinyl alcohol. After dipping, the alloy matrix is dried in air and heated in air at 1000°C for 1 hour to give the final catalyst support.

Catalytic material, specifically platinum in this example, is then deposited by a conventional technique involving dipping in a platinum salt solution and subsequent heat treatment.

Whilst the alloy matrix may be treated to form an oxide surface layer prior to coating with the alumina gel and powder mixture, we prefer that the alloy is substantially unoxidised at this stage. During the heat treatment in air to bake on the alumina, oxide forms on the surface of the alloy and grows into the alumina coating thereby improving the bonding of the coating to the alloy.

It should be noted that where $\delta$ alumina powder is employed, heating during both manufacture and use to a temperature (about 1100°C) where conversion to $\alpha$ alumina commences should be avoided since this conversion involves a significant reduction in exposed surface area.

The invention is not restricted to the details of the foregoing example. For instance, as wetting agent any ethylene oxide condensate may be used. An alternative to Nonidet P4 is Tergitol NPX which is an alkyl phenol ether of polyethylene glycol. As binder, any water soluble cellulose ether may be employed in place of the Moviol N85–88.

I claim:

1. A catalyst system comprising an aluminum bearing ferritic steel substrate, an electrically insulating ceramic layer on a surface of said ferritic steel substrate, and a catalytic material supported upon the ceramic layer, said aluminum bearing steel substrate comprising an alloy of iron, chromium, aluminum, and yttrium, and having the property of forming an alumina layer on heating in air, said alumina layer protecting the steel substrate against further oxidation attack, and said ceramic layer comprising a layer of alumina formed by heating the aluminum bearing ferritic steel substrate in the presence of oxygen to cause the formation of a layer of alumina on the surface of the ferritic steel substrate from aluminum within the ferritic steel substrate, thereby forming a tenaciously adherent ceramic layer on said ferritic steel substrate.

2. A catalyst system according to claim 1 wherein said ceramic layer further comprises a layer of ceramic material having a high exposed surface area bonded by a further heat treatment in air to said alumina layer, said heat treatment causing additional alumina from within the ferritic steel substrate to grow into and tenaciously bond to said alumina layer, the layer of ceramic material having a high exposed surface area.

3. A catalyst system according to claim 1 wherein said catalytic material comprises platinum.

4. A catalyst system according to claim 1 wherein said catalytic material is deposited on the layer of alumina formed by heating the substrate in the presence of oxygen.

5. A catalyst system according to claim 1 wherein said steel substrate comprises up to 15% chromium, 0.5 to 12% aluminum, 0.1 to 3% yttrium and the balance iron.

6. A catalyst system according to claim 1 wherein said steel substrate is finely divided.

* * * * *